US008066332B2

(12) United States Patent
Huang

(10) Patent No.: US 8,066,332 B2
(45) Date of Patent: Nov. 29, 2011

(54) WHEELCHAIR ARMREST ADJUSTING MECHANISM

(75) Inventor: Shun-I Huang, Sikou Township, Chiayi County (TW)

(73) Assignee: Taiwan An I Co., Ltd., Sikou Township, Chiayi County (TW)

( * ) Notice: Subject to any disclaimer, the term of this patent is extended or adjusted under 35 U.S.C. 154(b) by 304 days.

(21) Appl. No.: 12/396,373

(22) Filed: Mar. 2, 2009

(65) Prior Publication Data

US 2010/0219671 A1 Sep. 2, 2010

(51) Int. Cl.
*A47C 7/54* (2006.01)
*B60N 2/46* (2006.01)

(52) U.S. Cl. .......... 297/411.35; 297/411.36; 297/411.37

(58) Field of Classification Search ............. 297/411.35, 297/411.36, 411.37
See application file for complete search history.

(56) References Cited

U.S. PATENT DOCUMENTS

| | | | | |
|---|---|---|---|---|
| 5,876,097 | A * | 3/1999 | Cao | 297/411.37 |
| 5,884,976 | A * | 3/1999 | Breen et al. | 297/411.37 |
| 6,296,313 | B1 * | 10/2001 | Wu | 297/411.35 |
| 6,409,266 | B1 * | 6/2002 | Chen | 297/411.37 |
| 6,948,775 | B2 * | 9/2005 | Tsai | 297/411.37 |
| 7,216,840 | B2 * | 5/2007 | Fang | 248/425 |
| 7,387,341 | B1 * | 6/2008 | Tsai | 297/411.35 |

* cited by examiner

*Primary Examiner* — David Dunn
*Assistant Examiner* — Philip Gabler
(74) *Attorney, Agent, or Firm* — patenttm.us

(57) ABSTRACT

The present invention provides a wheelchair armrest adjusting mechanism comprising a support unit having a horizontal support connected to a top of an upright support, and a plurality of locking units located one side of the horizontal support; wherein an armrest has a slide channel for engaging with the horizontal support, a stop hole for creating a passage to the slide channel in order to fit one of the locking units when the stop hole is aligned with the locking unit, and a control unit fitted in the stop hole for pushing against the locking unit. When the control unit is pushed and held, the armrest can be slid along the horizontal support to align with one of locking units; and when the control unit is released, the locking unit is pushed into the stop hole and thereby locks the armrest in place.

6 Claims, 5 Drawing Sheets

B-B'

WHEELCHAIR ARMREST ADJUSTING MECHANISM

FIELD OF THE INVENTION

The present invention relates to an armrest adjusting mechanism, and more particularly to a wheelchair armrest adjusting mechanism that allows a wheelchair user to conveniently adjust and lock the armrest to a suitable position.

BACKGROUND OF THE INVENTION

Most of wheelchairs in the market consist of the armrest fixedly located at both sides of the wheelchair, so that a user can rest his/her arms on the armrests or use the armrests as a support to get up from the wheelchair. Since the armrests are mostly fixed at both sides of the wheelchair, as a result, they are not adjustable in accordance with the heights or body sizes of the users, neither do they fulfill the specific needs of the disable users when certain circumstantial conditions arose Therefore, the conventional wheelchairs with fixed armrests are inconvenient and difficult to be used by disable people.

Therefore it is an objective of the present invention to provide an adjusting mechanism for wheelchair armrests, so that a wheelchair user can adjust and lock the armrests easily to a suitable position.

SUMMARY OF THE INVENTION

A primary object of the present invention is to provide an armrest adjusting mechanism applicable to wheelchair, in which a wheelchair user can conveniently slide the armrest forward or backward to a desired position according to the need of the user, and the armrest of the present invention can be locked easily and fixedly to the desirable position via a simple control unit.

The wheelchair armrest adjusting mechanism according to a preferred embodiment of the present invention comprises a support unit having an upright support, a horizontal support connected to a top of the upright support, and a plurality of locking units arranged on at least one side of the horizontal support; an armrest having a slide channel for engaging with the horizontal support, and a stop hole formed on one side of the armrest which is created a passage to the slide channel in such that the horizontal support can be positioned within the slide channel; an outer end of one of the locking units is located at the stop hole when the stop hole is aligned with the locking unit; and a control unit is fitted in the stop hole.

When the wheelchair armrest adjusting mechanism is mounted on a wheelchair, a user can conveniently push and hold the control unit and slide the armrest forward or backward to a desired position on the horizontal support, and then releases the control unit to allow the locking unit to engage with the stop hole and thereby lock the armrest to the adjusted position.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
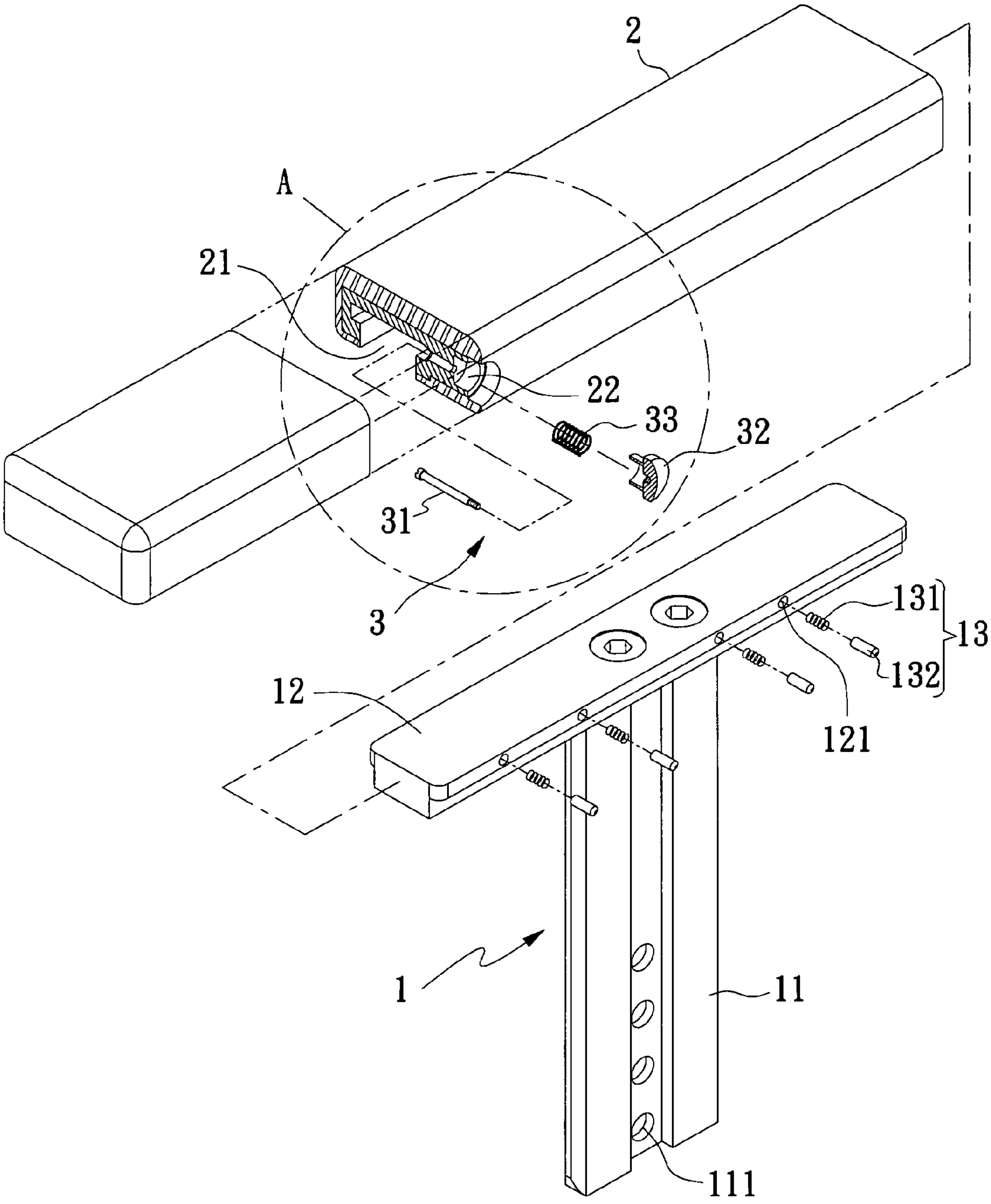
FIG. 1 is a 3-D schematic view with partial cutaway of a wheelchair armrest adjusting mechanism according to a preferred embodiment of the present invention.
Figure 2:
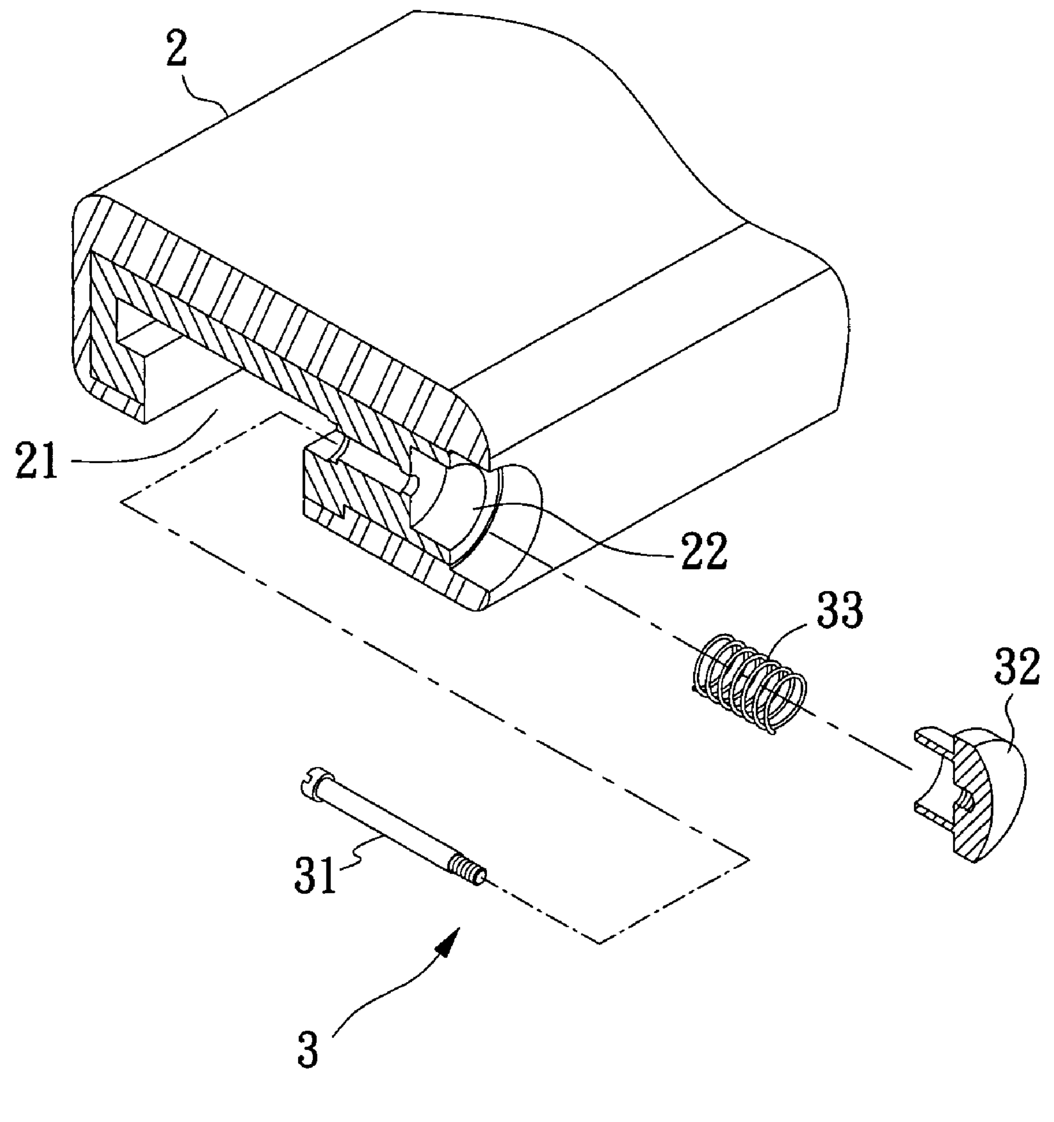
FIG. 2 is an enlarged view of the circled area A in FIG. 1.
Figure 3:
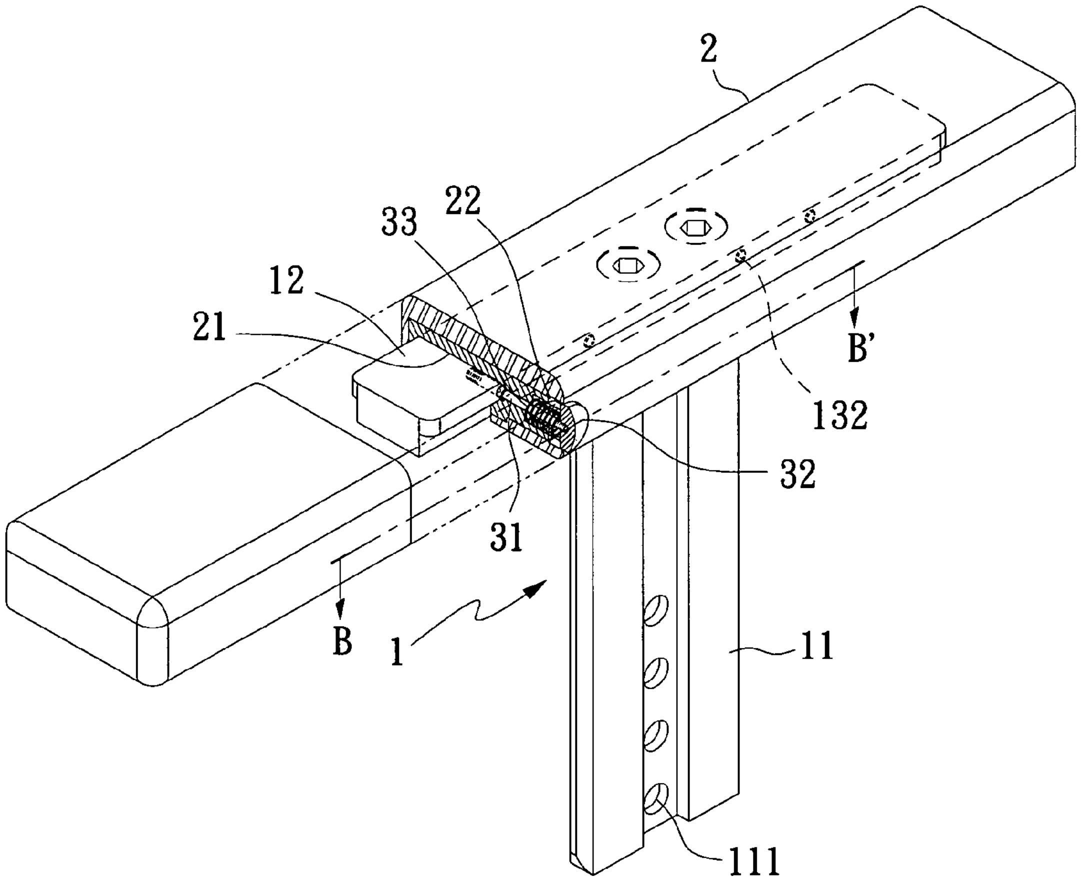
FIG. 3 is a 3-D assembled view of the wheelchair armrest adjusting mechanism of the present invention.

The present invention provides a wheelchair armrest adjusting mechanism that is applicable to be used on the wheelchair armrest. FIG. 1 shows that the wheelchair armrest adjusting mechanism of the present invention comprises a support unit 1, an armrest 2, and a control unit 3.

The support unit 1 further comprises at least an upright support 11, a horizontal support 12 connected to an upper end of the upright support 11, and a plurality of locking units 13 arranged on at least one side of the horizontal support 12. The upright support 11 is provided with vertical mounting holes 111. The horizontal support 12 is provided along at least one side with a plurality of receiving holes 121, which are used to position the locking units 13. Every locking unit 13 comprises an elastic element 131 that is used to engage with a locking pin 132 and the receiving hole 121, and the locking pin 132 has a bottom portion that is used to press against the elastic element 131 and has a top portion projected from the receiving hole 121 due to an elastic force of the elastic element 131.

The armrest 2 is integrated to a top of the support unit 1. The armrest 2 has a section defining a slide channel 21 for the horizontal support 12 to be slid within the slide channel 21. A stop hole 22 is provided at the armrest 2 in such that a passage to the slide channel 21 is created on one side of the armrest 2, in which the locking units 13 of the horizontal support 12 can be integrated with the armrest 2. When the armrest 2 is moved along in a horizontal direction, the stop hole 22 of the horizontal support 12 can be adjusted and aligned to with a desired position in accordance with the arrangement of the receiving holes 121 on the horizontal support 12, and once the desired position of the horizontal support 12 is located, the horizontal support 12 is locked to the armrest 2 via the locking units 13 and the stop hole 22.

The control unit 3 is fitted in the stop hole 22 on the armrest 2 and is aligned in accordance with the arrangement of the receiving holes 121 and is locked in place to the desired positioned with the locking units 13. The control unit 3 comprises at least a push rod 31, which is located in the stop hole 22 with an inner end pushing against the locking pin 132 of the locking unit 13. The control unit 3 of the present invention is designed in such that it is corresponding to the locking unit 13, and is engaged with the locking unit 13 to shift or lock the support unit 1 along the armrest 2 in different positions. A push button 32 having an inner side connected to an outer end of the push rod 31 is provided, and an outer side of the push bottom 32 is protruded from an outer end of the stop hole 22 on the armrest 2; and an elastic element 33 put around the push rod 31 with two ends separately pressing against inner bottoms of the stop hole 22 and the push button 32.

Figure 4:
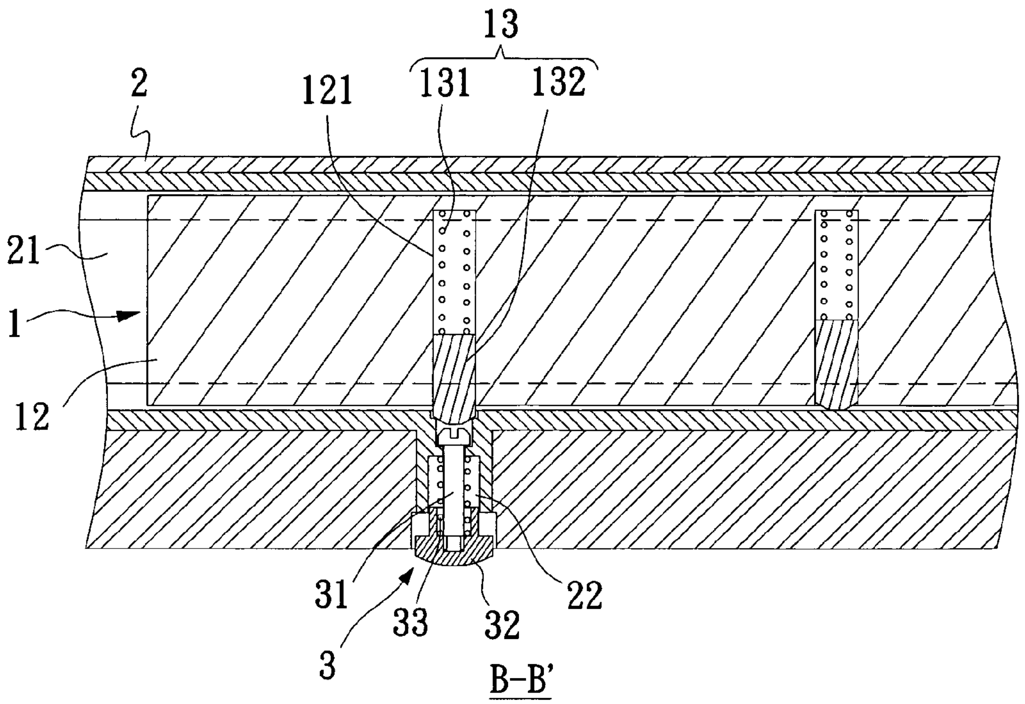
FIG. 4 is a sectional top view of the wheelchair armrest adjusting mechanism in a locked state along the cutting line B-B' of FIG. 3.
Figure 5:
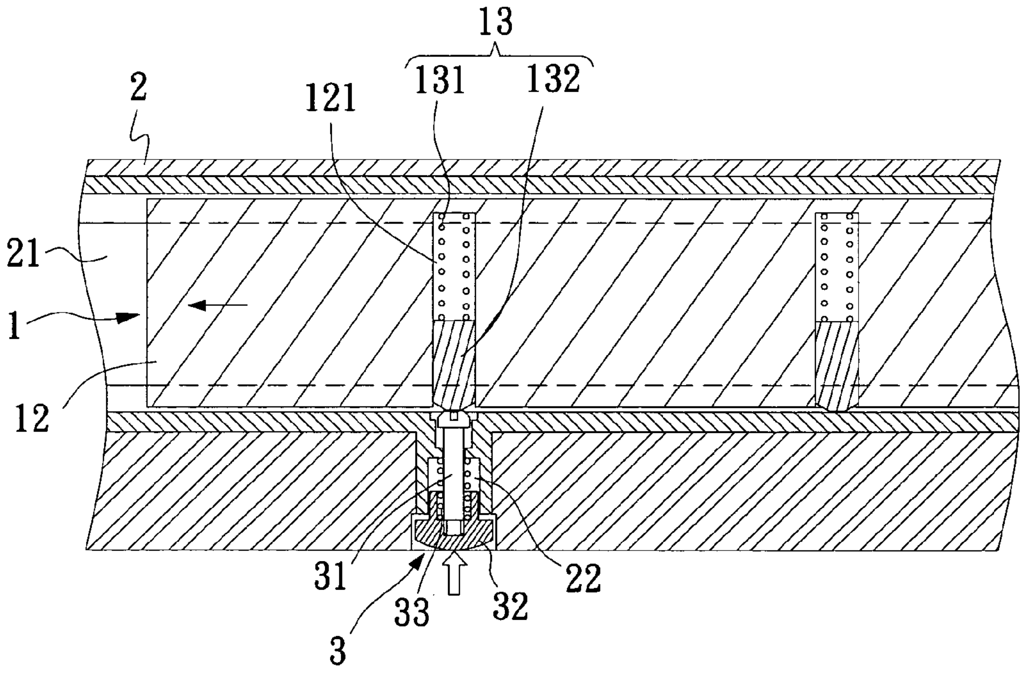
FIG. 5 is sectional top view of the wheelchair armrest adjusting mechanism in a released state.
Figure 6:
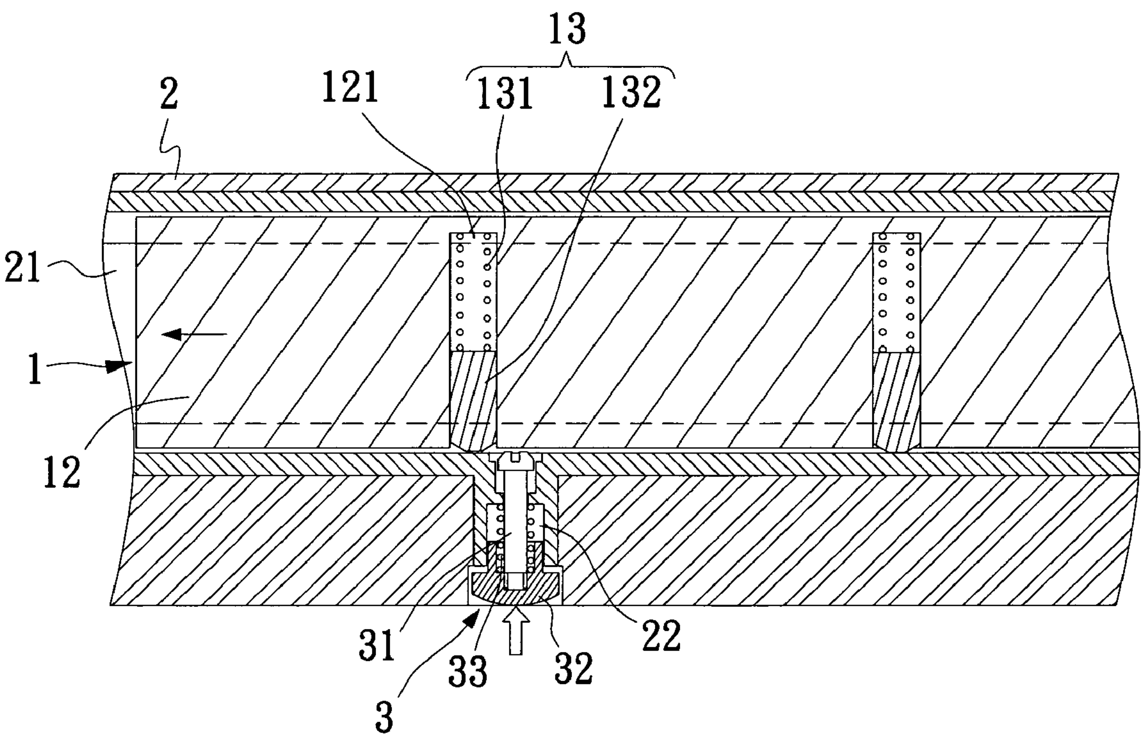
FIG. 6 is sectional top view of the wheelchair armrest adjusting mechanism in a moving state.

FIGS. 4, 5, and 6 are enlarged and sectional top views of the armrest 2 in various states such as, in a locking state, in a releasing state, and in a moving state respectively. Please refer to FIGS. 4, 5, and 6 along with FIG. 1, the mounting holes 111 on the upright support 11 and matching fastening elements (not shown) of the present invention are designed to be utilized easily and are mounted the support unit 1 to each side of a wheelchair. The armrest 2 is assembled to the horizontal support 12. With the armrest 2 connected to the horizontal support 12 as shown in FIG. 4, a top portion of the locking pin 132 of the locking units 13 is elastically pushed by the elastic force of the elastic element 131 into the stop hole 22 of the armrest 2, and a bottom portion of the locking pin 132 is located within the receiving hole 121 of the horizontal support 12. Therefore, the armrest 2 is set to a desired position on the horizontal support 12. When a user wants to get up from the wheelchair or to do some movements, the armrest 2 of the wheelchair has to be adjusted to a suitable position before the user can make any movement, in such instant, the wheelchair armrest adjusting mechanism of the present invention provides the user a convenient way to adjust the position of the armrest easily by simply pushing the push button 32 of the control unit 3 to a desired position. FIG. 5 shows that when the push button 32 of the control unit 3 is pushed the elastic element 33 would be compressed by the push rod 31, which is moved by the push button 32 to push the top part of the push rod 31 in contact with the top portion of the locking pin 132 in such that the push rod 31 is pushed into the receiving hole 121 to compress the elastic element 131. As a result, the locking pin 132 is separated from the stop hole 22 of the armrest 2 and is no longer to lock the horizontal support 12 in the armrest 2. In other words, the armrest 2 can be freely slid along the horizontal support 12 to a desired position, the user can easily slide the armrest 2 either forward or backward to the desired position without much difficulty as shown in FIG. 6. When the armrest 2 is being slid, the user can release the push button 32, the locking pin 132 would be pressed against an inner sidewall surface of the slide channel 21 in order to slide the armrest 2 forward or backward along the horizontal support 12 until the armrest 2 is moved to the desired position. Then, the top portion of the locking pin 132 of another locking unit 13 on the horizontal support 12 is pushed into the stop hole 22 by the elastic force of the elastic element 131 while its bottom portion of the locking pin 132 is located within the receiving hole 121 of the horizontal support 12. Therefore, the armrest 2 is adjusted to a suitable position easily, and it can be locked easily and simply to the horizontal support 12 again without much difficulty, as shown in FIG. 4. The wheelchair armrest adjusting mechanism of the present invention can be utilized easily and provides a most convenient way for the disable people to use the wheelchairs without much physical effort.

According to the above arrangements, a wheelchair user can utilize the locking units and the control unit to adjust the various positions of the armrest by sliding the armrest forward or backward to a suitable position. Thus, the present invention is novel, improved, and industrially practical for the utilizations in this field.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A wheelchair armrest adjusting mechanism, comprising:

a support unit having at least an upright support, a horizontal support connected to an upper end of the upright support, and a plurality of locking pins arranged to one side of the horizontal support;

an armrest assembled to a top of the support unit and having a slide channel at a lower side of the armrest in order to engage with the horizontal support of the support unit for enabling horizontal movement of the armrest relative to the horizontal support along an axis; wherein a stop hole is provided at one side of the armrest to create a passage to the slide channel in order to fit one of the locking pins and lock the armrest against horizontal movement relative to the horizontal support along the axis; and a control unit fitted into the stop hole of the armrest, wherein the control unit is aligned and adapted to be selectively pressed by a user against said one of the locking pins when said one of the locking pins is fitted within the stop hole to perform an unlocking of the armrest to permit horizontal movement of the armrest relative to the horizontal support along the axis.

2. The wheelchair armrest adjusting mechanism as claimed in claim 1, wherein the upright support is provided with a plurality of vertical mounting holes.

3. The wheelchair armrest adjusting mechanism as claimed in claim 1, wherein a plurality of receiving holes is provided at one side of the horizontal support to position the locking pins respectively; each of the locking pins having an associated elastic element fitted in the receiving hole, and each locking pin having a bottom portion and a top portion, wherein the bottom portion of the locking pin is pressed against the elastic element and the top portion of the locking pin is pushed from the receiving hole due to an elastic force of the elastic element.

4. The wheelchair armrest adjusting mechanism as claimed in claim 1, wherein the control unit comprises a push rod located in the stop hole, a push button having an inner side connected to an outer end of the push rod and an outer side protruded from one side of the armrest, and an elastic element located around the push rod, in which one end of the elastic element is pressed against inner bottom of the stop hole and the other end of the elastic element is pushed against inner bottom of the push button.

5. The wheelchair armrest adjusting mechanism as claimed in claim 1, wherein the control unit comprises a push button adapted to be pressed by a user to cause said control unit to press against said one of the locking pins to press said one of the locking pins away from being fitted within the stop hole.

6. The wheelchair armrest adjusting mechanism as claimed in claim 5, wherein the control unit further comprises a push rod cooperating with said push button, wherein said push rod is moved when said push button is pressed by the user to cause said push rod to press against said one of the locking pins to press said one of the locking pins out of the stop hole.

* * * * *